United States Patent
Haupt et al.

[11] Patent Number: 5,717,942
[45] Date of Patent: Feb. 10, 1998

[54] RESET FOR INDEPENDENT PARTITIONS WITHIN A COMPUTER SYSTEM

[75] Inventors: Michael L. Haupt, Roseville; Doug A. Fuller, Eagan; Lewis A. Boone, Fridley, all of Minn.

[73] Assignee: Unisys Corporation, Blue Bell, Pa.

[21] Appl. No.: 364,799

[22] Filed: Dec. 27, 1994

[51] Int. Cl.$^6$ .................. G06F 13/40; G06F 13/38
[52] U.S. Cl. .................. 395/800; 395/312; 395/309; 364/DIG. 1; 364/DIG. 2; 364/489
[58] Field of Search .................. 395/800, 289, 395/309, 450, 312, 184.01, 427, 182.03, 311; 364/DIG. 1, DIG. 2, 578, 490, 489; 370/60, 94.1, 85.13

[56] References Cited

U.S. PATENT DOCUMENTS

| | | | |
|---|---|---|---|
| 3,641,505 | 2/1972 | Artz et al. | 340/172.5 |
| 3,812,469 | 5/1974 | Hauck et al. | 340/172.5 |
| 3,872,447 | 3/1975 | Tessera et al. | 340/172.5 |
| 4,056,844 | 11/1977 | Izumi | 364/200 |
| 4,070,704 | 1/1978 | Calle et al. | 364/200 |
| 4,130,865 | 12/1978 | Heart et al. | 364/200 |
| 4,245,306 | 1/1981 | Besemer et al. | 364/200 |
| 4,349,871 | 9/1982 | Lary | 364/200 |
| 4,426,681 | 1/1984 | Bacot et al. | 364/200 |
| 4,437,157 | 3/1984 | Witalka et al. | 364/200 |
| 4,442,487 | 4/1984 | Fletcher et al. | 364/200 |
| 4,525,777 | 6/1985 | Webster et al. | 364/200 |
| 4,667,288 | 5/1987 | Keeley et al. | 364/200 |
| 4,755,930 | 7/1988 | Wilson, Jr. et al. | 364/200 |
| 4,761,755 | 8/1988 | Ardini, Jr. et al. | 364/749 |
| 4,794,521 | 12/1988 | Ziegler et al. | 364/200 |
| 4,807,110 | 2/1989 | Pomerene et al. | 364/200 |
| 4,843,541 | 6/1989 | Bean et al. | 364/200 |
| 4,843,542 | 6/1989 | Dashiell et al. | 364/200 |
| 4,860,192 | 8/1989 | Sachs et al. | 364/200 |
| 4,868,818 | 9/1989 | Madan et al. | 371/11.3 |
| 4,888,771 | 12/1989 | Benignus et al. | 371/16.1 |
| 4,891,810 | 1/1990 | deCorlieu et al. | 371/9.1 |
| 4,979,107 | 12/1990 | Advani et al. | 364/200 |
| 4,984,153 | 1/1991 | Kregness et al. | 364/200 |
| 4,992,930 | 2/1991 | Gilfeather et al. | 364/200 |
| 4,995,035 | 2/1991 | Cole et al. | 370/95.2 |
| 5,014,197 | 5/1991 | Wolf | 364/200 |
| 5,023,776 | 6/1991 | Gregor | 364/200 |
| 5,025,365 | 6/1991 | Mathur et al. | 364/200 |
| 5,025,366 | 6/1991 | Baror | 364/200 |
| 5,058,006 | 10/1991 | Durdan et al. | 364/200 |
| 5,113,522 | 5/1992 | Dinwiddie, Jr. et al. | 395/700 |
| 5,125,081 | 6/1992 | Chiba | 395/325 |
| 5,129,077 | 7/1992 | Hillis | 395/500 |
| 5,148,533 | 9/1992 | Joyce et al. | 395/425 |
| 5,165,018 | 11/1992 | Simor | 395/300 |
| 5,170,472 | 12/1992 | Cwiakala et al. | 395/275 |
| 5,193,163 | 3/1993 | Sanders et al. | 395/425 |
| 5,265,257 | 11/1993 | Simcoe et al. | 325/736 |
| 5,280,474 | 1/1994 | Nickolls et al. | 395/800 |
| 5,313,602 | 5/1994 | Nakamura | 395/425 |
| 5,452,239 | 9/1995 | Dai et al. | 364/578 |

OTHER PUBLICATIONS

Wilson, Jr. "Hierarchical Cache/Bus Architecture for Shared Memory Multiprocessors", Computer Society Press of the IEEE, 1987, pp. 244–250.

*Primary Examiner*—Daniel H. Pan
*Attorney, Agent, or Firm*—Nawrocki, Rooney & Sivertson, P.A.

[57] ABSTRACT

A method and apparatus for providing a multi-source reset for independent partitions within a multiprocessor computer system. In a system having at least two partitions wherein the at least two partitions share interconnect hardware, a reset may be provided to a first one of the at least two partitions while allowing the remaining of the at least two partitions to continue to operate. The interconnect hardware may provide means for resetting a first portion of the interconnect hardware associated with the first partition while allowing the remaining portions of the interconnect hardware to continue to operate undisturbed. The reset function may be triggered by hardware or software in either partition or by a system control facility.

20 Claims, 10 Drawing Sheets

RESET FOR INDEPENDENT PARTITIONS WITHIN A COMPUTER SYSTEM

CROSS REFERENCE TO CO-PENDING APPLICATIONS

The present application is related to U.S. patent application Ser. No. 08/364,760, filed Dec. 27, 1994, now U.S. Pat. No. 5,603,005 entitled "Cache Coherency Scheme for Xbar Storage Structure" and U.S. patent application Ser. No. 07/762,282, filed Sep. 19, 1991, now abandoned, entitled "Cooperative Hardware and Microcode Control System for Pipelined Instruction Execution", and U.S. patent application Ser. No. 08/302,381, filed Sep. 8, 1994, now U.S. Pat. No. 5,574,914, entitled "Site Configuration Management System" and U.S. patent application Ser. No. 08/235,196, filed Apr. 29, 1994, entitled "Data Coherency Protocol for Multi-Level Cached High Performance Multiprocessor System" (which is a continuation of U.S. patent application 07/762,276, filed on Sep. 19, 1991, now abandoned), all assigned to the assignee of the present invention and all incorporated herein by reference.

BACKGROUND OF THE INVENTION

1. Field of the Invention

The present invention generally relates to multi-processor systems and more particularly relates to multiple-processor systems which utilize partitioning schemes.

2. Description of the Prior Art

Ever increasing demand for high throughput data processing systems has caused computer designers to develop sophisticated multi-processor designs. Initially, additional processors were provided to improve the overall bandwidth of the system. While the additional processors provided some level of increased performance, it became evident that further improvements were necessary particularly in the area system partitioning. Improved system partitioning schemes were necessary to optimize the parallel nature of such systems and to efficiently manage the growing number of processors included therein.

Partitioning of a system refers to the allocation of the system's data processing resources to a number of pre-defined "partitions". Each partition may operate independently and asynchronously from the other partitions in the system. Partitioning may allow a number of parallel tasks to be independently executed within the system. For example, a first portion of the system resources may be allocated to a first partition to process a first task while a second portion of the system resources may be allocated to a second partition to process a second task.

A system controller may control the addition or deletion of the system resources from or to the various partitions in the system. That is, the system resources that are allocated to a particular partition may be added or deleted therefrom depending on the type of task performed by that partition. For example, a large task may require more system resources than a small task. A system controller may add resources to the partition of the system servicing the large task thereby increasing the efficiency of the overall system.

A major step in dynamic resource allocation was to provide input/output subchannels with the capability of dynamic allocation as taught in U.S. Pat. No. 4,437,157, issued to Witalka et al. Logical file designations for peripheral devices is suggested by U.S. Pat. No. 5,014,197, issued to Wolf. Similarly, U.S. Pat. No. 4,979,107, issued to Advani et al., suggests logical assignment of peripheral subsystem operating parameters.

The capability to reconfigure has been used in a number of systems applications. U.S. Pat. No. 4,070,704, issued to Calle et al., provides a boot strap program with the capability to change the initial load peripheral device upon determination of a failure in the primary loading channel. Perhaps the most often stated purpose for reconfiguration is to provide some degree of fault tolerance. U.S. Pat. No. 4,891,810, issued to de Corlieu et al., and U.S. Pat. No. 4,868,818, issued to Madan et al., suggest system reconfiguration for that reason. A related but not identical purpose is found in U.S. Pat. No. 4,888,771, issued to Benignus et al., which reconfigures for testing and maintenance.

The capability to reconfigure a data processing system can support centralized system control as found in U.S. Pat. No. 4,995,035, issued to Cole, et al. A current approach is through the assignment of logical names for resources as found in U.S. Pat. No. 4,245,306, issued to Besemer et al. and U.S. Pat. No. 5,125,081, issued to Chiba. An extension of the capability to identify resources by logical names is a virtual system in which the user need not be concerned with physical device limitations, such as suggested in U.S. Pat. No. 5,113,522, issued to Dinwiddie, Jr. et al.

Though the prior art does show some of the rudiments of system reconfiguration, the focus tends to be on a single integrated system with resources being added or deleted. A primary advantage in reconfiguration of resources is to manage multiple systems to accommodate resources which may be more globally shared.

Both processors and storage structures may be partitioned in this manner. For example, a number of processors within the system may be allocated to a first partition while the remaining processors may be allocated to a second partition. Similarly, a number of storage structures may be allocated to the first partition while the remaining storage structures may be allocated to the second partition. Since the storage structures may be interconnected in a bussed or a point-to-point manner, it is possible that the interconnection hardware may cross a partition boundary.

A problem may arise when an error or other predetermined condition is detected in one of the partitions within the system. Since the interconnection hardware may cross partition boundaries, it may be necessary to interrupt the interconnect hardware thereby interrupting the operation of all partitions within the system.

Further, prior art systems typically have a system controller which controls a reset function, usually via a system wide interface. In such systems, all of the partitions within the system must be interrupted by the system controller and the hardware associated therewith must be reset accordingly. A limitation of such systems is that all of the independently operating partitions must be interrupted when an error is detected in any one of the partitions.

SUMMARY OF THE INVENTION

The present invention overcomes many of the limitations found in the prior art by providing a method and apparatus for providing a multi-source reset for independent partitions within a multiprocessor computer system. In a system having at least two partitions wherein the at least two partitions share interconnect hardware, a reset may be provided to a first one of the at least two partitions while allowing the remaining of the at least two partitions to continue to operate. The interconnect hardware may provide means for reseting a first portion of the interconnect hardware associated with the first partition while allowing the remaining portions of the interconnect hardware to continue to operate undisturbed. The reset function may be triggered by hardware or software in either partition or by a system control facility.

In an exemplary embodiment, the present invention may be incorporated into a system having at least two storage controllers wherein the at least two storage controllers are interconnected via an XBAR interface. The overall system architecture may comprise the clustering of a plurality of instruction processors, input/output processors, and main memory modules about a storage controller. The instruction processors and input/output processors within a cluster may locally access the memory elements associated with the same storage controller. However, because a plurality of clusters may communicate over a cross-bar (XBAR) interface, each instruction processor and input/output controller may also make remote accesses to all other memory elements within the system.

The XBAR interface is a connection scheme that allows multiple requesters to access multiple storage controllers in a parallel fashion. These remote accesses are inherently of higher performance than found in a bussed architecture because they are essentially point-to-point and may be performed in parallel. A further advantage of the XBAR interface scheme is that substantial hardware may be saved over a strict point-to-point architecture by not requiring that all of the storage controllers be burdened with the interface and connection costs associated therewith.

The data processing resources used in the exemplary embodiment, including instruction processors, memory modules, input/output controllers, etc., may be configured by a centralized site configuration management system into a plurality of separate and autonomous data processing systems. Each of these data processing systems, called partitions, may be assigned to perform a number of different tasks, and each partition may provide an appropriate portion of the total resources to perform a corresponding task. Following partitioning, each separate partition operates, subject to a dedicated system control facility, totally asynchronously of the other partitions. Reconfiguration within a partition may be employed to accommodate changes in loading, maintenance, etc. within that partition. Further, as overall task loading, component failures, and maintenance requirements change, the system may be capable of moving resources from one partition to another, or visa-versa.

It is possible for the centralized site configuration management system to partition the system resources such that the XBAR interface block may service more than one partition. For example, in a system having four storage controllers which are interconnected via an XBAR interface, the centralized site configuration management system may place a first and a second storage controller into a first partition and a third and a fourth storage controller into a second partition. In this configuration, the XBAR interface may service both the first and the second partition thereby crossing the partition boundary.

In accordance with the present invention, the XBAR interface may comprise means for resetting a first portion of the XBAR interface hardware which is associated with the first partition while allowing the remaining portions of the XBAR interface to continue to operate undisturbed. This may occur when an error or other predetermined condition is detected in a partition. This may confine the effects of the error or other predetermined condition to the partition in which it was detected. The reset function may be triggered by hardware or software associated with any partition or by a system control facility.

In an exemplary embodiment, the XBAR interface block may comprise a number of input logic blocks and a number of output logic blocks. Each of the input logic blocks may be coupled to a corresponding one of the storage controllers. Similarly, each of the output logic blocks may be coupled to a corresponding one of the storage controllers. Each of the input logic blocks may be coupled to all of the output logic blocks such that any input logic block may communicate with any output logic blocks. In this configuration, the XBAR interface block may simultaneously route data from the four input logic blocks to any allowable output logic block. That is, up to four transfers can occur at any give time.

Each of the four storage controllers may provide a reset signal to the XBAR interface block. The reset signal from each of the storage controllers may be provided to the corresponding input logic block and the corresponding output logic block. That is, a reset signal from a storage controller may clear the input logic and the output logic associated with that storage controller. This allows the XBAR logic associated with one partition to be cleared without affecting data transfers occurring in the other partitions.

In a preferred embodiment, when a reset signal is issued by a storage controller to the XBAR interface block, not all of the logic associated with the corresponding input logic block and the corresponding output logic block are reset. Only the logic necessary to effectuate the reset condition is reset by the preferred embodiment. This feature may reduce the power as well as the physical size of the resulting circuitry.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
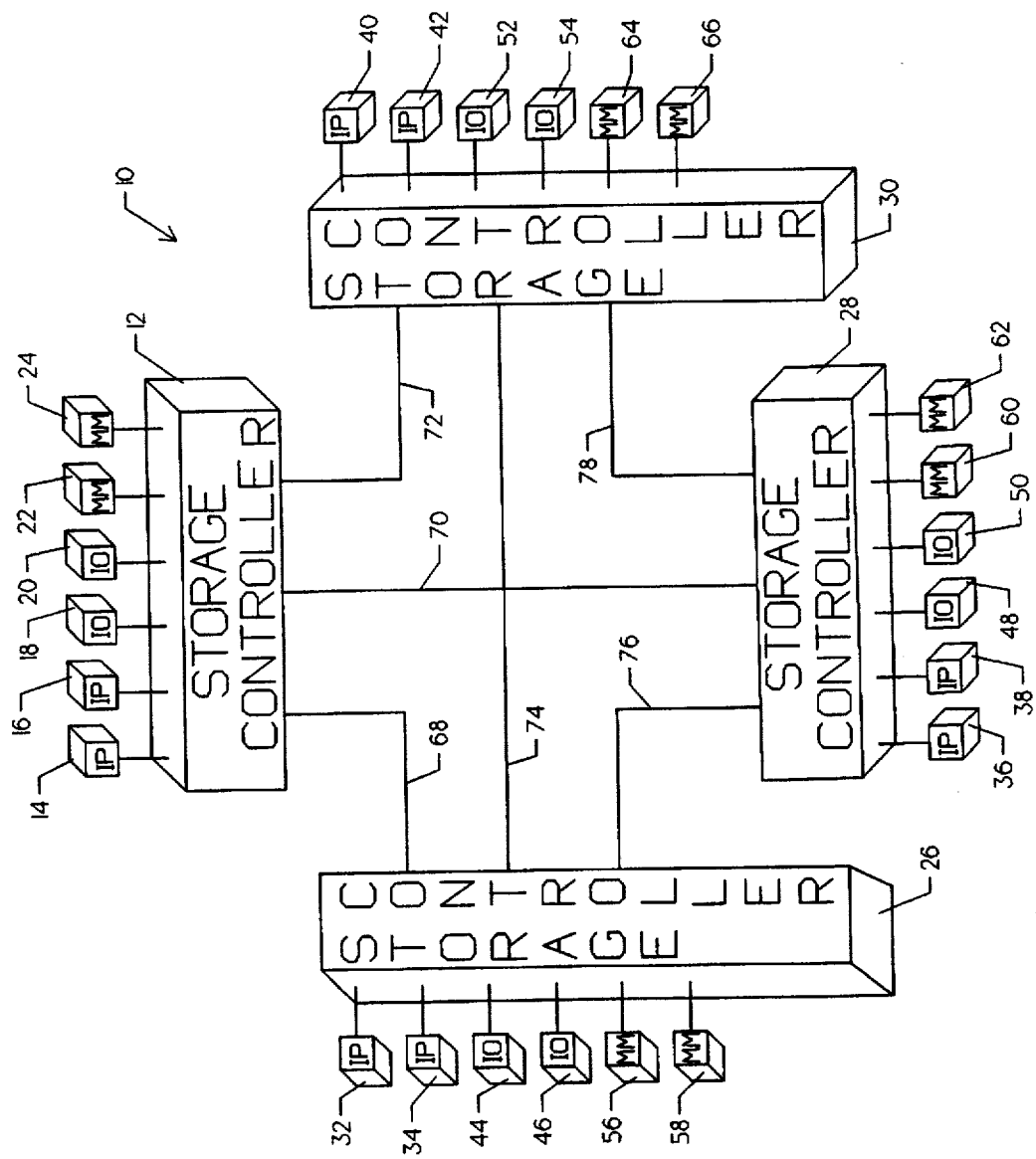
FIG. 1 is a block diagram of a system employing a point-to-point architecture.

FIG. 1 is a block diagram of a system employing a point-to-point architecture. Data processing system 10 includes four individual processing clusters, each having its own storage controller and each having point-to-point communication with the other clusters via a storage controller to storage controller interface.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output processor 18, input/output processor 20, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below.

Input/output processors 18 and 20, along with main memory modules 22 and 24, may be elements currently available, such as found in the Unisys Model 2200/600 series. Input/output processors 44, 46, 48, 50, 52, and 54 and main memory modules 56, 58, 60, 62, 64, and 66 may be similarly found.

The system shown in FIG. 1 may be partitioned such that a first portion of the data processing resources are assigned to a first partition and second portion of the data processing resources are assigned to a second partition. For example, storage controllers 12 and 26 may be assigned to a first partition and storage controllers 28 and 30 may be assigned to a second partition. The first and second partition may operate independently and asynchronously from one another. Partitioning may allow a number of parallel tasks to be independently executed within the system.

A system controller may control the addition or deletion of the system resources from or to the various partitions in the system. That is, the system resources that are allocated to a particular partition may be added or deleted therefrom depending on the type of task performed by that partition. For example, a large task may require more system resources than a small task. A system controller may add resources to the partition of the system servicing the large task thereby increasing the efficiency of the overall system.

Since the storage controllers are interconnected in a point-to-point manner, it is possible that the interconnection hardware may cross the partition boundaries. A problem may arise when an error or other predetermined condition is detected in one of the partitions within the system. Since the interconnection hardware may cross partition boundaries, it may be necessary to interrupt the interconnect hardware thereby interrupting the operation of all partitions within the system.

Further, prior art systems typically have a system controller which controls a reset function, usually via a system wide interface. In such systems, all of the partitions within the system must be interrupted by the system controller and the hardware associated therewith must be reset accordingly. A limitation of such systems is that all of the independently operating partitions must be interrupted when an error or other predetermined condition is detected in any one of the partitions. The above referenced limitations would similarly exist in a bussed architecture.

Figure 2:
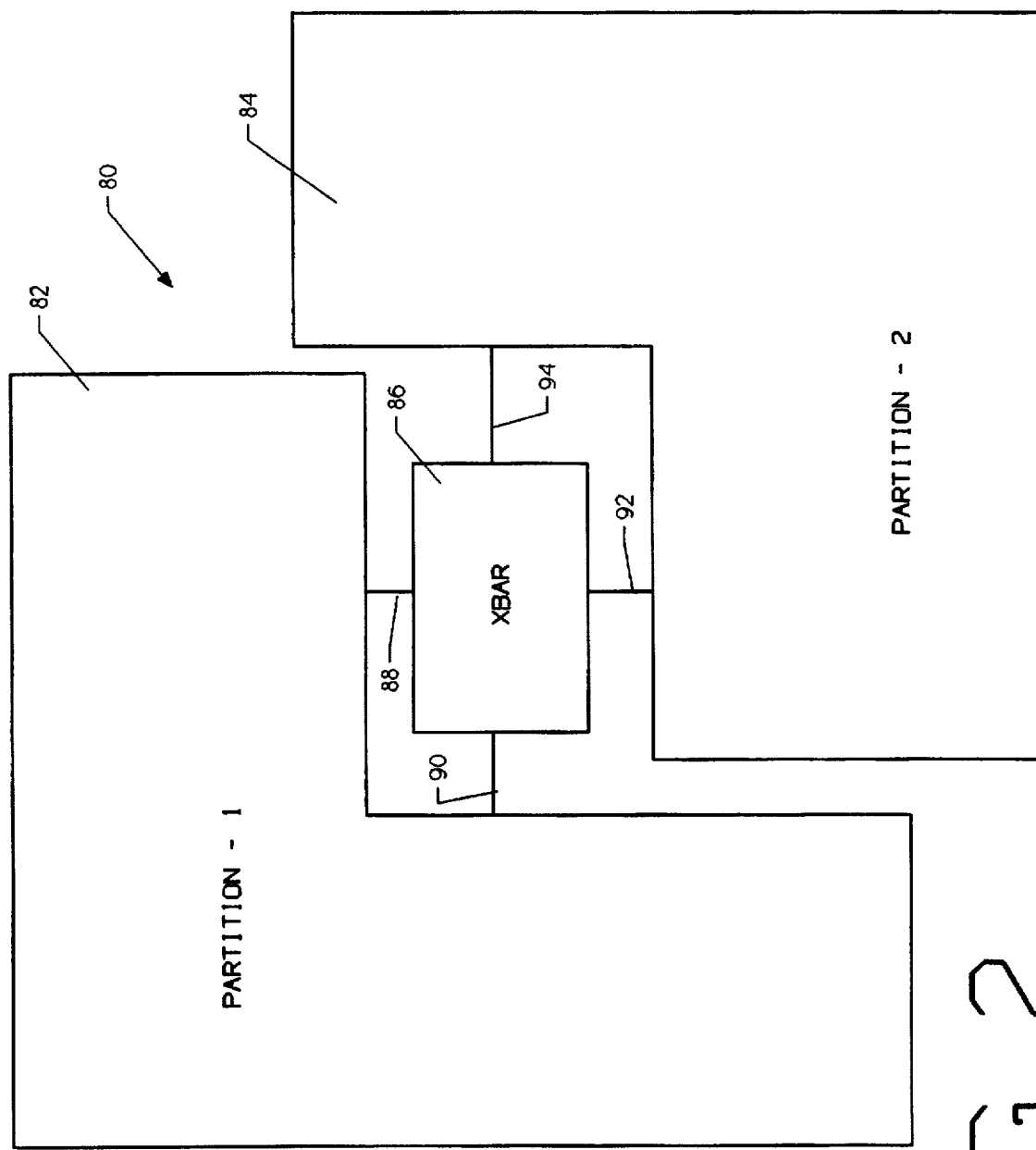
FIG. 2 is a block diagram of a first embodiment of the present invention having two partitions and further having a common XBAR interface block servicing both of the partitions.

FIG. 2 is a block diagram of a first embodiment of the present invention having two partitions and further having a common XBAR interface block servicing both of the partitions. A reset may be provided by a first one of the at least two partitions while allowing the remaining of the at least two partitions to continue to operate. The interconnect hardware may provide means for resetting a first portion of the interconnect hardware associated with the first partition while allowing the remaining portions of the interconnect hardware to continue to operate undisturbed. The reset function may be triggered by hardware or software in either partition or by a system controller facility.

Referring to FIG. 2, the system is generally shown at 80. The system may comprising a plurality of data processing resources (not shown) wherein the plurality of data processing resources may be partitioned into at least two partitions. In the exemplary embodiment, the plurality of data processing resources may be partitioned into a first partition 82 and a second partition 84. The first partition 82 and the second partition 84 may comprise separate and autonomous data processing systems. Each of these partitions may be assigned to perform a number of different tasks, and each partition may be provided with an appropriate portion of the total data processing resources to perform the corresponding task. Following the partitioning of the data processing resources, the first partition 82 may operate asynchronously from the second partition 84. Reconfiguration of the data processing resources within a partition may be employed to accommodate changes in loading, maintenance, etc. within a partition.

As overall task loading, component failures, and maintenance requirements change, the system may be capable of moving resources from the first partition 82 to the second partition 84, or visa-versa. For example, the first partition 82 may be notified wherein an executive of the first partition 82 may deactivate the corresponding data processing resource. After this has been accomplished, the definition of the first partition 82 may be modified to remove the subject resource assignment.

Following removal of the resource from the first partition 82, the corresponding resource may be reassigned to the second partition 84. That is, the system may assign the resource to the second partition 84 by notifying the second partition 84 to activate the corresponding resource therein. In the exemplary embodiment, the system may exercise configuration and reconfiguration control over all resources at a given site or group of related sites. This permits resources to be assigned and reassigned amongst otherwise separate and autonomous partitions.

It is possible for the system to partition the data processing resources such that the XBAR interface 86 may service more than one partition. For example, in the exemplary embodiment shown in FIG. 2, the XBAR interface block 86 may service the first partition 82 and the second partition 84. The XBAR interface block 86 may be coupled to the first partition 82 via interfaces 88 and 90, and may be further coupled to the second partition 84 via interfaces 92 and 94.

In accordance with the present invention, the XBAR interface block 86 may comprise means for resetting a first portion of the XBAR interface hardware which is associated with the first partition 82 while allowing the remaining portions of the XBAR interface to continue to operate undisturbed. This may occur when an error or other predetermined condition is detected in the first partition 82. This may confine the effects thereof to the first partition 82. The reset function may be triggered by hardware or software associated with any partition or by a system control facility.

Figure 3:
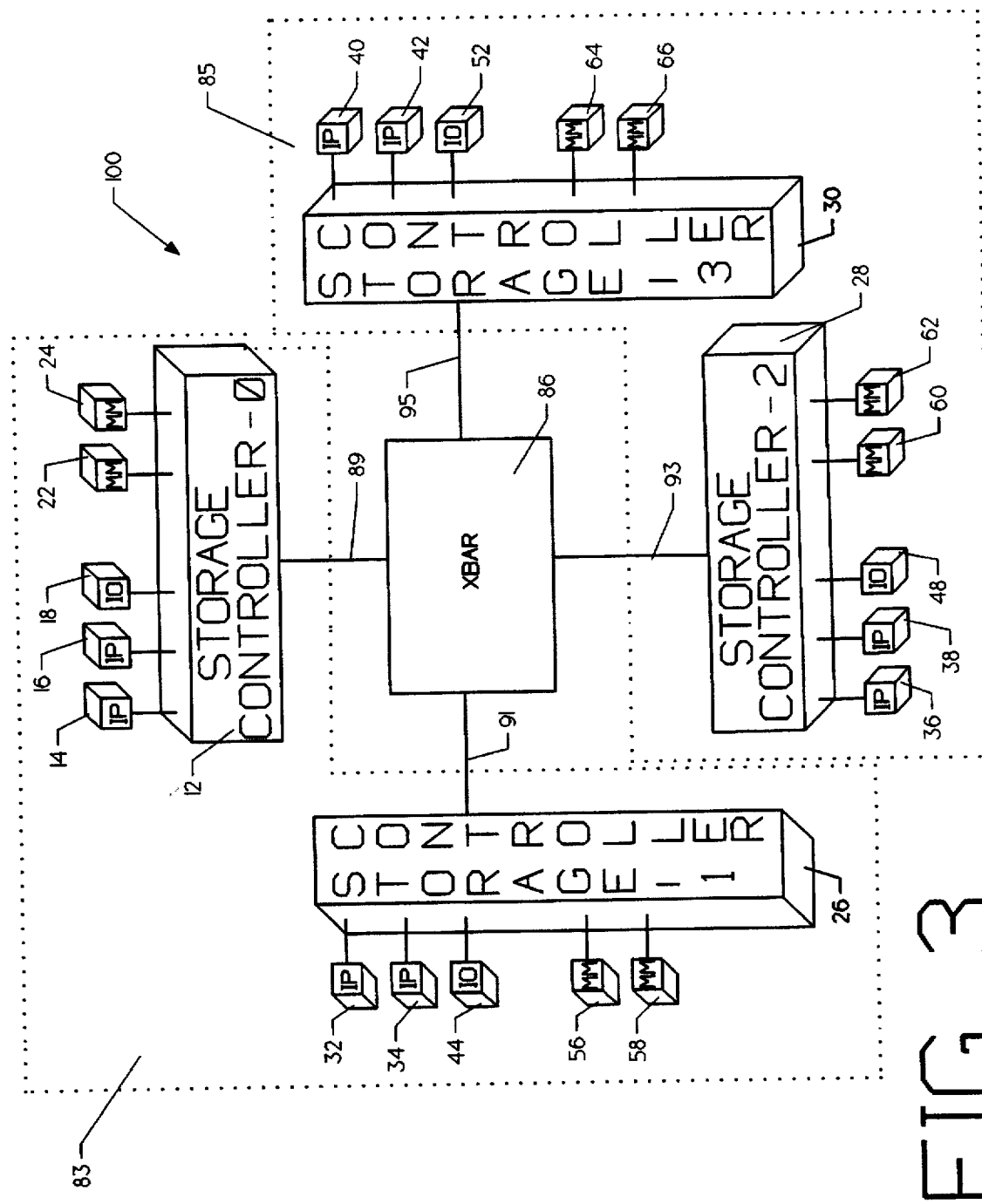
FIG. 3 is a block diagram of a fully populated system having at least two partitions which employs an XBAR interface block in accordance with an exemplary embodiment of the present invention.

FIG. 3 is a block diagram of a fully populated system having at least two partitions which employs an XBAR interface block in accordance with an exemplary embodiment of the present invention. Data processing system 100 may include four individual processing clusters, each having it's own storage controller. Each storage controller may be in communication with all other clusters via XBAR interface block 86.

In the point-to-point system shown in FIG. 1, each of the storage controllers contains a storage controller-to-storage controller interface which manages the communication between the attendant storage controllers. If there are four storage controllers in the data processing system as shown in FIG. 1, each storage controller may manage the communication between itself and the other three storage controllers. This system is optimal if the number of storage controllers is limited. However, as the number of storage controllers that are incorporated into the data processing system increases, the complexity of the interfacing circuitry within each of the storage controllers also increases because of the increased number of point-to-point communication links within the system. Moreover, to expand a system to include additional clusters, each of the storage controllers must be replaced with a storage controller that can handle the additional point-to-point communication links created therein. At the same time, for systems with only a few storage controllers, the extra interfaces are not used and in fact are a cost burden.

In an exemplary embodiment of the present invention, a portion of the interface function between the storage controllers is moved from the storage controllers themselves into XBAR interface block 86. This moves the interface and connection costs from the storage controllers and places them into a centralized location. In this way, the interfacing and connection costs may be minimized.

This improvement may be especially important when a large number of storage controllers (e.g. >four) are included within a system. When more than four storage controllers are included in a system, the interface and connection costs become a substantial burden on each storage controller. This burden may be relieved by including XBAR interface block 86. Further, in systems that may be expandable, it may be advantageous to include XBAR interface block 86 such that each of the storage controllers may not have to be modified or replaced when a system is upgraded to include more storage controllers. Rather, XBAR interface block 86 may be designed to be expandable itself or a different XBAR interface block 86 may be placed within the system along with the additional storage controllers when an upgrade is made. As can be seen, XBAR interface block 86 may have significant advantages over an essentially point-to-point architecture. However, for relatively few storage controllers (e.g. ≦four), an essentially point-to-point architecture may be preferred because it may be faster and may require less physical space.

Storage controller 12 is coupled to XBAR interface block 86 via interface 88. Storage controller 26 is coupled to XBAR interface block 86 via interface 90. Storage controller 28 is coupled to XBAR interface block 86 via interface 92. Storage controller 30 is coupled to XBAR interface block 86 via interface 94. Storage controller 12 may communicate with storage controllers 26, 28, and 30 via XBAR interface block 86. Storage controller 26 may communicate with storage controllers 12, 28, and 30 via XBAR interface block 86. Storage controller 28 may communicate with storage controllers 12, 26, and 30 via XBAR interface block 86. Similarly, storage controller 30 may communicate with storage controllers 12, 26, and 28 via XBAR interface block 86.

Storage controller 12 is fully populated with instruction processor 14, instruction processor 16, input/output processor 18, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below. Input/output processor 18, along with main memory modules 22 and 24, may be elements currently available, such as found in the Unisys Model 2200/500 series. Input/output processors 44, 48, and 52 and main memory modules 56, 58, 60, 62, 64, and 66 may be similarly found.

A more general description of the construction and operation of the exemplary embodiment may be found in the above referenced and commonly assigned co-pending U.S. patent application, entitled "Cooperative Hardware and Microcode Control System for Pipelined Instruction Execution", which has been incorporated herein by reference. The data coherency scheme used by the exemplary embodiment may be in accordance with co-pending U.S. patent application Ser. No. 08/364,760, filed Dec. 27, 1994, now U.S. Pat. No. 5,603,005 entitled "Cache Coherency Scheme for XBAR Storage Structure", which is expressly incorporated herein by reference.

The system generally shown at 100 may be partitioned into at least two partitions. In the exemplary embodiment, storage controllers 12 and 26 may be in a first partition 83 and storage controllers 28 and 30 may be in a second partition 85. The first partition 83 and the second partition 85 may comprise separate and autonomous data processing systems. Each of these partitions may be assigned to perform a number of different tasks, and each partition may be provided with an appropriate portion of the total data processing resources to perform the corresponding task. Following the partitioning of the data processing resources, the first partition 83 may operate asynchronously from the second partition 85. Reconfiguration of the data processing resources within a partition may be employed to accommodate changes in loading, maintenance, etc. within a partition.

As overall task loading, component failures, and maintenance requirements change, the system may be capable of moving resources from the first partition 83 to the second partition 85, or visa-versa. For example, the first partition 83 may be notified wherein an executive of the first partition 83 may deactivate storage controller 12. After this has been accomplished, the definition of the first partition 83 may be modified to remove the storage controller 12 assignment.

Following removal of the storage controller 12 from the first partition 83, the storage controller 12 may be reassigned to the second partition 85. That is, the system may assign storage controller 12 to the second partition 85 by notifying the second partition 85 to activate the storage controller 12 therein. In the exemplary embodiment, the system may exercise configuration and reconfiguration control over all resources at a given site or group of related sites. This permits resources to be assigned and reassigned amongst otherwise separate and autonomous partitions. A further discussion of the partitioning scheme of the exemplary embodiment may be found in co-pending U.S. patent application Ser. No. 08/302,381, filed Sep. 8, 1994, entitled "Site Configuration Management System", which is expressly incorporated herein by reference.

It is possible for the system to partition the data processing resources such that the XBAR interface 86 may service more than one partition. For example, in the exemplary embodiment shown in FIG. 3, the XBAR interface block 86 may service the first partition 83 and the second partition 85. The XBAR interface block 86 may be coupled to the first partition 83 via interfaces 89 and 91, and may be further coupled to the second partition 85 via interfaces 93 and 95.

In accordance with the present invention, the XBAR interface block 86 may comprise means for reseting a first portion of the XBAR interface hardware which is associated with the first partition 83 while allowing the remaining portions of the XBAR interface to continue to operate undisturbed. This may occur when an error or other predetermined condition is detected in the first partition 83. This may confine the effects thereof to the first partition 83. The reset function may be triggered by hardware or software associated with any partition or by a system control facility.

Figure 4:
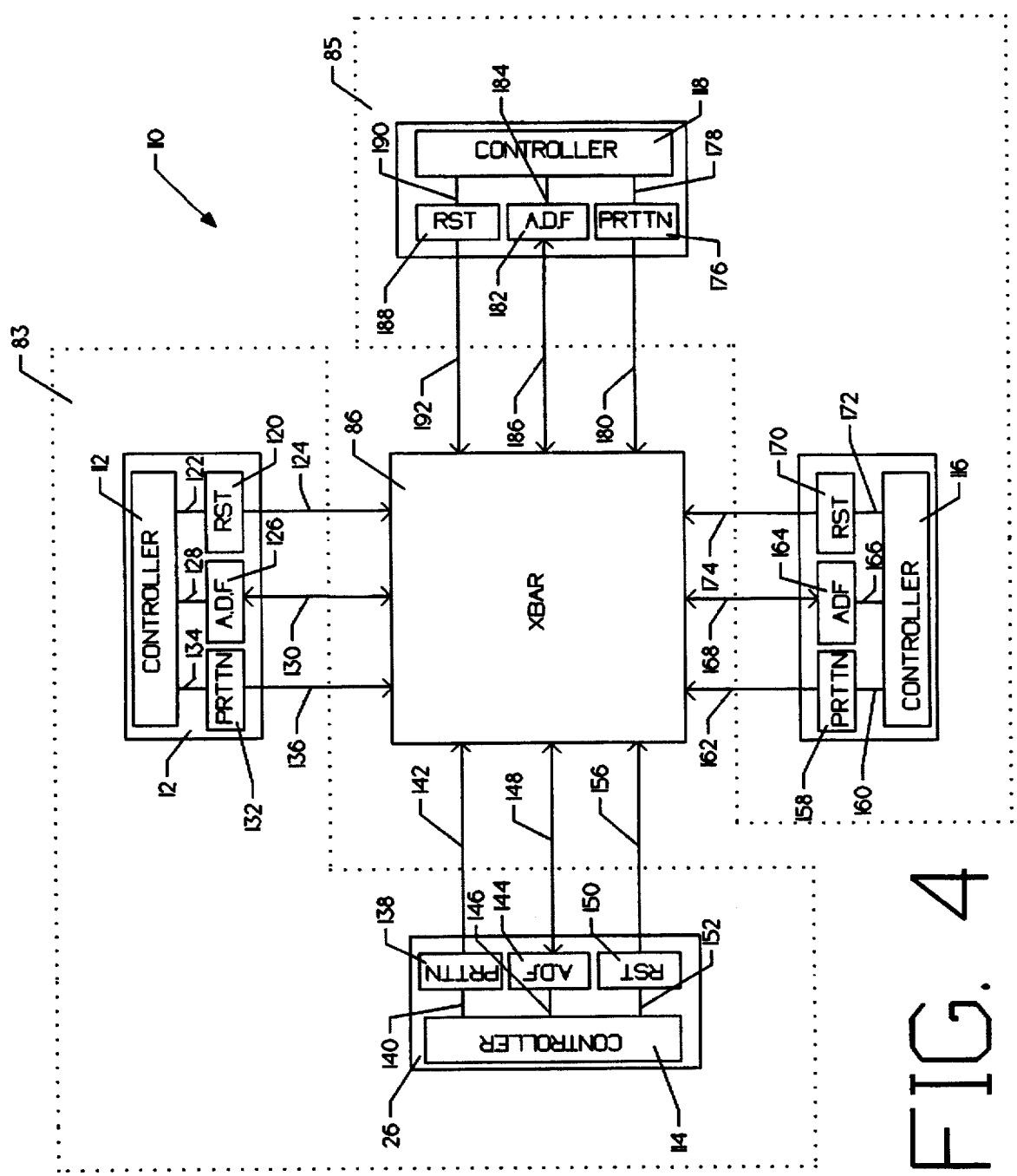
FIG. 4 is a block diagram of the fully populated system shown in FIG. 3 detailing the reset interface between each of the storage controllers and the XBAR interface block.

FIG. 4 is a block diagram of the fully populated system shown in FIG. 3 detailing the reset interface between each of the storage controllers and the XBAR interface block. In the exemplary embodiment, storage controller 12 may comprise a controller 112, a partition register 132, a function register 126, and a reset register 120. The controller 112 may be coupled to the partition register 132 via interface 134, the function register 126 via interface 128, and the reset register 120 via interface 122. Partition register 132, function register 126, and reset register 120 may be coupled to XBAR interface block 86 via interfaces 136, 130, and 124, respectively.

Controller 112 may load a partition word into partition register 132. The partition word may indicate which of the other storage controllers 26, 28, and 30 may communicate with storage controller 12. In the exemplary embodiment, storage controllers 12 and 26 may be in partition 83. In this configuration, the partition word may be set such that storage controller 12 may communicate with storage controller 26 but not with storage controllers 28 and 30. It is recognized that the partitioning of the storage controllers 12, 26, 28, and 30 as shown in FIG. 4 is only exemplary. It is contemplated that storage controllers 12, 26, 28, and 30 may be partitioned into various groupings as desired. It is further contemplated that the storage controllers 12, 26, 28, and 30 may be reconfigured as overall task loading, component failures, and maintenance requirements change. A further discussion of partitioning may be found above.

Referring to storage controller 12 of FIG. 4, function register 126 may store an address, a data word, a function word, an interrupt word, and a destination address. The operation of function register 126 may be best described by example. That is, storage controller 12 may request to write a data word in one of the cache elements in storage controller 26. To accomplish this, controller 112 may load function register 126 with a write data word, a write address, a "write" function, and a destination address. This information may be passed to XBAR interface block 86 via interface 130. XBAR interface block 86 may direct this information to the appropriate destination storage controller as required.

The reset register 120 may be controlled by controller 122 via interface 122. Controller 122 may load a reset code into reset register 120 whenever an error or other predetermined condition is detected in storage controller 12. The reset code may be passed to XBAR interface block 86 via interface 124. In accordance with the present invention, the XBAR interface block 86 may comprise means for reseting a first portion of the XBAR interface hardware which is associated with the first partition 83 while allowing the remaining portions of the XBAR interface to continue to operate undisturbed. The reset function may be triggered by hardware or software associated with any partition or by a system control facility. Since the first partition 83 and the second partition 85 may operated independently, it may not be necessary to interrupt the second partition 85 when an error or other predetermined condition occurs in the first partition 83. This may result in a more efficient multiprocessor system.

Similarly, storage controllers 26, 28, and 30 each may have a controller, a partition register, a function register, and a reset register. Storage controller 26 may comprise a controller 114, a partition register 138, a function register 144, and a reset register 150. The controller 114 may be coupled to the partition register 138 via interface 140, the function register 144 via interface 146, and the reset register 150 via interface 152. Partition register 138, function register 144, and reset register 150 may be coupled to XBAR interface block 86 via interfaces 142, 148, and 156, respectively.

Storage controller 28 may comprise a controller 116, a partition register 158, a function register 164, and a reset register 170. The controller 116 may be coupled to the partition register 158 via interface 160, the function register 164 via interface 166, and the reset register 170 via interface 172. Partition register 158, function register 164, and reset register 170 may be coupled to XBAR interface block 86 via interfaces 162, 168, and 174, respectively.

Storage controller 30 may comprise a controller 118, a partition register 176, a function register 182, and a reset register 188. The controller 118 may be coupled to the partition register 176 via interface 178, the function register 182 via interface 184, and the reset register 188 via interface 190. Partition register 176, function register 182, and reset register 188 may be coupled to XBAR interface block 86 via interfaces 180, 186, and 192, respectively. Storage controllers 26, 28, and 30 may operate in a similar manner to storage controller 12 as described above.

Figure 5:
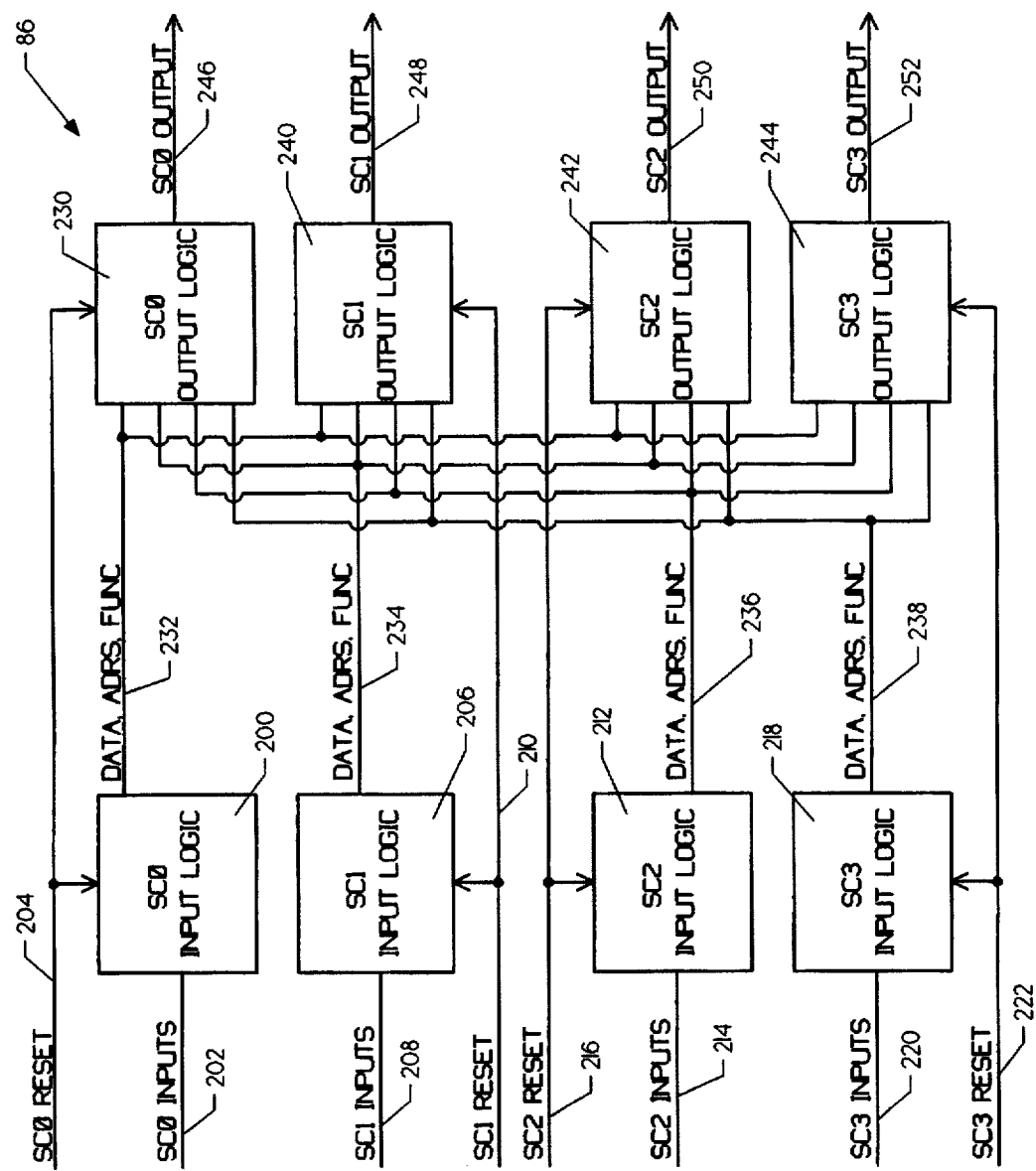
FIG. 5 is a schematic diagram of the XBAR interface block in accordance with the present invention.

FIG. 5 is a schematic diagram of the XBAR interface block 86 in accordance with an exemplary embodiment of the present invention. The schematic diagram is generally shown at 86 and corresponds to the XBAR interface block 86. The XBAR interface block 86 may comprise a number of input logic blocks and a number of output logic blocks. In general, the number of input logic blocks and the number of output logic blocks will be the same and will be equal to the number of storage controllers within a corresponding system. In the exemplary embodiment, XBAR interface block 86 may comprises four input logic blocks and four output logic blocks.

Each of the input logic blocks is coupled to a corresponding one of the storage controllers. Similarly, each of the output logic blocks is coupled to a corresponding one of the storage controllers. Each of the input logic blocks may be coupled to all of the output logic blocks such that any input logic block may communicate with any output logic blocks.

Referring to FIG. 5, an input logic block 200 may be coupled to a storage controller-0 via interface 202. Similarly, an input logic block 206 may be coupled to a storage controller-1 via interface 208. An input logic block 212 may be coupled to a storage controller-2 via interface 214. Finally, an input logic block 218 may be coupled to a storage controller-3 via interface 220.

An output logic block 230 may be coupled to a storage controller-0 via interface 246. Similarly, an output logic block 240 may be coupled to a storage controller-1 via interface 248. An output logic block 242 may be coupled to a storage controller-2 via interface 250. Finally, an output logic block 244 may be coupled to a storage controller-3 via interface 252.

Input logic block 200 may be coupled to output logic blocks 230, 240, 242, and 244 via interface 232. Similarly, input logic block 206 may be coupled to output logic blocks 230, 240, 242, and 244 via interface 234. Input logic block 212 may be coupled to output logic blocks 230, 240, 242, and 244 via interface 236. Finally, input logic block 218 may be coupled to output logic blocks 230, 240, 242, and 244 via interface 238.

In the exemplary embodiment, each of the output logic blocks 230, 240, 242, and 244 may select the output of one of the four input logic blocks 200, 206, 212, and 218. In this configuration, it is possible for any storage controller to communicate with any other storage controller. Further, the XBAR interface block 86 may simultaneously route data from all four input logic blocks 200, 206, 212, and 218 to any allowable output logic block 230, 240, 242, and 244. That is, up to four transfers can occur at any give time.

When a first storage controller would like to communicate with a second storage controller, the first storage controller forwards a request to the XBAR interface block 86 along with any accompanying address, data, interrupt or invalidate information. The request is captured by the input logic associated with the first storage controller.

The input logic blocks 200, 206, 212, and 218 have two primary functions. First, the input logic block may buffer the transferred address, read or write data, invalidate information, and/or interrupt data. Data for more than one request may be resident in the corresponding input logic block at any given time. Second, the input logic block validates the requested destination. The input logic block makes this validation based upon the requesting storage controller's partition bits which are stored in the corresponding partition registers (see above) and a number of "available" signals that are provided by the each of the storage controllers. If the destination is allowable, the request is transferred to the output logic block that corresponds to the destination storage controller. If the destination is not allowable, an error is returned to the requesting storage controller.

After the request is forwarded to the appropriate output logic block, the request is latched into a request stack (see below). The requests may be prioritized in a predetermined way. In the exemplary embodiment, the requests may be prioritized based upon the request type and on which of the storage controller made the request.

When the destination storage controller and the XBAR interface are ready to service a given request, the output logic may select the output of the input logic block which is associated with the requesting storage controller. Address, data, interrupt, and/or invalidate information may be gated from the corresponding input logic block to the destination storage controller.

Each of the four storage controllers may provide a reset signal from the reset register to the XBAR interface block 86. A reset signal from storage controller-0 may be coupled to input logic block 200 and output logic block 230 via interface 204. Similarly, a reset signal from storage controller-1 may be coupled to input logic block 206 and output logic block 240 via interface 210. A reset signal from storage controller-2 may be coupled to input logic block 212 and output logic block 242 via interface 216. Finally, a reset signal from storage controller-3 may be coupled to input logic block 218 and output logic block 244 via interface 222.

A storage controller reset may only clear the input logic and the output logic associated with that storage controller. For example, a reset from storage controller-0 on interface 204 may only reset input logic 200 and output logic 230. This allows the XBAR logic associated with one partition to be cleared without affecting data transfers occurring in the other partitions. For example, the XBAR logic that is associated with the first partition 83 containing storage controller-0 and storage controller-1 may be cleared via the reset signals on interfaces 204 and 210. At the same time, transfers involving units in the second partition 85 containing storage controller-2 and storage controller-3 can continue without interruption.

When a reset signal is issued to the XBAR interface block 86, not all of the logic associated with the corresponding input logic block and output logic block need to be reset. Input logic cleared by the reset may include a request register, error conditions, and the state information associated with the control and destination validation logic. Output logic cleared by the reset may include the priority logic and the state information associated with the control sequences (see below).

Figure 6:
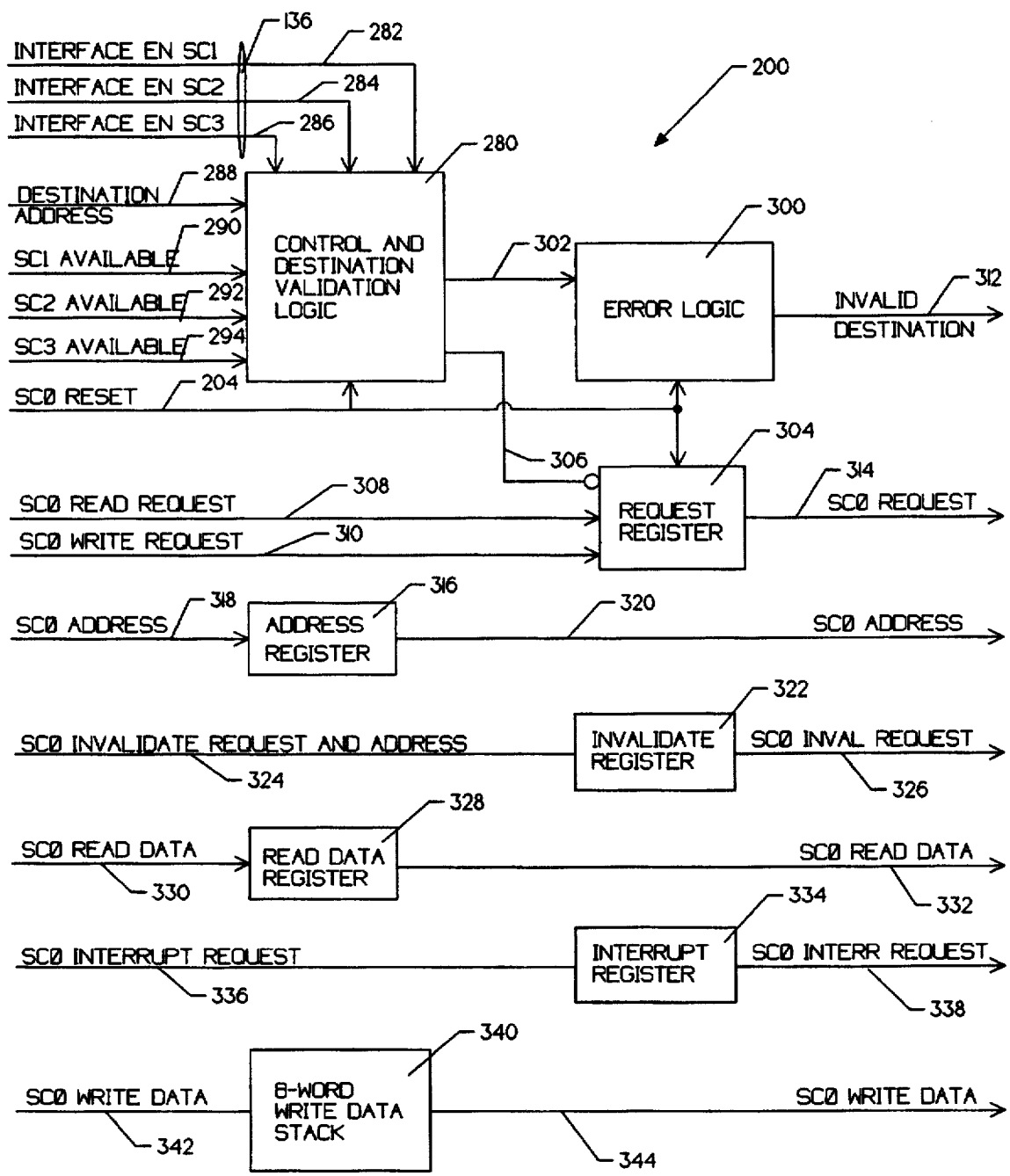
FIG. 6 is a schematic diagram of the SC0 input logic block of the XBAR interface block shown in FIG. 5.

FIG. 6 is a schematic diagram of the storage controller-0 input logic block 200 of the XBAR interface block 86 shown in FIG. 5. It is recognized that input logic blocks 206, 212, and 218 may be similarly constructed. The schematic diagram is generally shown at 200.

The input logic block 200 may comprise a control and destination validation logic block 280. In the exemplary embodiment, storage controller 12 of FIG. 4 corresponds to storage controller-0. Storage controller-0 may provide a number of interface enable bits to the control and destination validation logic block 280 via interface 136 (see FIG. 4). The interface enable bits may be provided by the partition register 132 of storage controller-0. In the exemplary embodiment, one interface enable bit may be provided for each of the remaining storage controllers. For example, storage controller-0 may provide an interface enable SC1 bit via interface 282, an interface enable SC2 bit via interface 284, and an interface enable SC3 bit via interface 286 to control and destination validation logic block 280. Storage controller-0 may set the corresponding interface enable bit for each storage controller that is in the same partition as storage controller-0. That is, if storage controller-0 and storage controller-1 are in a first partition and storage controller-2 and storage controller-3 are in a second partition, storage controller-0 may set the interface enable SC1 bit on interface 282 and clear the interface enable SC2 bit on interface 284 and the interface enable SC3 bit on interface 286. This indicates that storage controller-0 may communicate with storage controller-1 but not with storage controller-2 or storage controller-3.

Storage controller-0 may provide a destination address to control and destination validation logic 280 via interface 288. The destination address indicates to which storage controller a request is directed. In the exemplary embodiment, the destination address may reference storage controller-1, storage controller-2 or storage controller-3.

Each of the storage controllers may provide a storage controller "available" signal to the XBAR interface block 86. Control and destination validation logic block 280 of input logic 200 may receive the "available" signals from the other storage controllers. That is, control and destination validation logic block 280 may receive an "available" signal from storage controller-1, storage controller-2, and storage controller-3 via interfaces 290, 292, and 294, respectively.

Control and destination validation logic block 280 validates the requested destination. This validation may be based upon the requesting storage controller's interface enable bits on interfaces 282, 284, and 286 that are provided by the corresponding partition register (see above) and the "available" signals on interfaces 290, 292, and 294 that are provided by each of the other storage controllers. If the destination is not allowed, an signal is provided to an error logic block 300 via interface 302. Error logic block provides an invalid destination error signal to the requesting storage controller via interface 312. If the destination is allowed, control and destination validation logic provides an enable signal to a request register 304 via interface 306.

The request register 304 stores a request provided by the requesting storage controller. In the exemplary embodiment, the requesting storage controller is storage controller-0. The request may be a read request or a write request and may be provided to request register 304 via interfaces 308 and 310, respectively. When control and destination validation logic block 280 provides the enable to request register 304 via interface 306, the request may be transferred to the appropriate output logic block which corresponds to the destination storage controller via interface 314.

The input logic block 200 may buffer the transferred address, read or write data, invalidate information, and/or interrupt data. In the exemplary embodiment, an address may be provided by storage controller-0 via interface 318 to an address register 316. Address register 316 may buffer the address and provide the result to the appropriate output logic block which corresponds to the destination storage controller via interface 320.

An invalidate request may be provided by storage controller-0 via interface 324 to an invalidate register 322. Invalidate register 322 may buffer the invalidate request and provide the result to the appropriate output logic block which corresponds to the destination storage controller via interface 326.

Read data may be provided by storage controller-0 via interface 330 to a read data register 328. Read data register 328 may buffer the read data and provide the result to the appropriate output logic block which corresponds to the destination storage controller via interface 332.

An interrupt request may be provided by storage controller-0 via interface 336 to an interrupt register 334. Interrupt register 334 may buffer the interrupt request and provide the result to the appropriate output logic block which corresponds to the destination storage controller via interface 338.

Write data may be provided by storage controller-0 via interface 342 to a write data stack 340. Write data stack 340 may buffer the write data and provide the result to the appropriate output logic block which corresponds to the destination storage controller via interface 344. In the exemplary embodiment, write data stack 340 may comprise an 8-word write data stack. Data for more than one request may be resident in the corresponding input logic block at any given time. For example, data may be queued in both the 8-word write data stack 340 and the read data register 328 simultaneously. This provides an even further buffering function.

A reset may be provided by storage controller-0 via interface 204. The reset may be provided to control and destination validation logic block 280, error logic 300, and request register 304. As stated above, a storage controller may reset only the input logic and the output logic within the XBAR interface block 86 which is associated with that storage controller. For example, a reset from storage controller-0 on interface 204 may only reset input logic 200 and output logic 230. This allows the XBAR logic associated with one partition to be cleared without affecting data transfers occurring in another partition. That is, the XBAR logic associated with the first partition 83 containing storage controller-0 and storage controller-1 may be cleared via the reset signals on interfaces 204 and 210 (see FIG. 5). At the same time, transfers involving units in the second partition 85 containing storage controller-2 and storage controller-3 may continue without interruption.

When a reset signal is issued to the XBAR interface block 86, not all of the logic associated with the corresponding input logic block and output logic block need be reset. The input logic that is cleared by a corresponding reset may include the request register 304, the error logic 300, and the state information associated with the control and destination validation logic 280 as shown. Output logic cleared by the reset may include the priority logic and the state information associated with the control sequences (see below).

Figure 7:
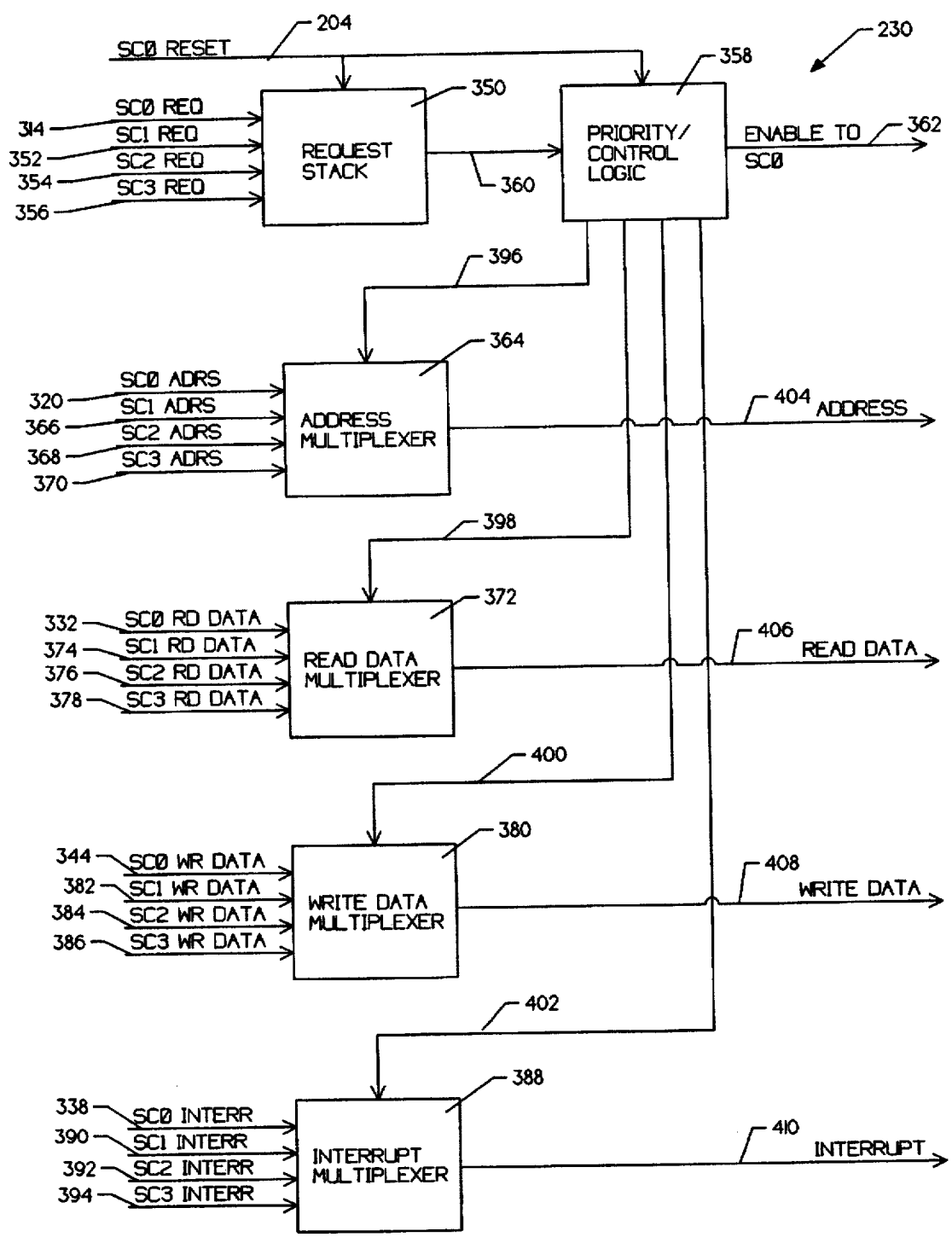
FIG. 7 is a schematic diagram of the SC0 output logic block of the XBAR interface block shown in FIG. 5.

FIG. 7 is a schematic diagram of the SC0 output logic block 230 of the XBAR interface block 86 shown in FIG. 5. It is recognized that output logic blocks 240, 242, and 244 may be similarly constructed. The schematic diagram is generally shown at 230.

The output logic block 230 may comprise a request stack 350. In the exemplary embodiment, storage controller 12 of FIG. 4 corresponds to storage controller-0. Each of the storage controllers in the system may provide a request to XBAR interface block 86. These requests may be buffered in the corresponding input logic blocks as described above. Request stack 350 may receive requests from each of the four input logic blocks via interfaces 314, 352, 354, and 356. Request stack 350 provides the requests to a priority/control logic block 358 via interface 360. Priority/control logic block 358 prioritizes the requests based upon a predetermined algorithm. In the exemplary embodiment, priority/control logic block 358 may prioritize the requests based upon the request type (read or write) and upon which storage controller made the request. Priority/control logic block 358 provides a selected request to the corresponding storage controller.

The output logic block 230 may further comprise an address multiplexer 364. Each of the storage controllers in the system may provide a request having a corresponding address to XBAR interface block 86. These requests and addresses may be buffered in the corresponding input logic blocks as described above. Address multiplexer 364 may receive the addresses from each of the four input logic blocks via interfaces 320, 366, 368, and 370. The selection of the proper address is controlled by priority/control logic block 358 via interface 396.

The output logic block 230 may further comprise a read data multiplexer 372. Each of the storage controllers in the system may provide a request having a corresponding read data element to XBAR interface block 86. These requests and read data elements may be buffered in the corresponding input logic blocks as described above. Read data multiplexer 372 may receive the read data elements from each of the four input logic blocks via interfaces 332, 374, 376, and 378. The selection of the proper read data element is controlled by priority/control logic block 358 via interface 398.

The output logic block 230 may further comprise a write data multiplexer 380. Each of the storage controllers in the system may provide a request having a corresponding write data element to XBAR interface block 86. These requests and write data elements may be buffered in the corresponding input logic blocks as described above. Write data multiplexer 380 may receive the write data elements from each of the four input logic blocks via interfaces 344, 382, 384, and 386. The selection of the proper write data element is controlled by priority/control logic block 358 via interface 400.

The output logic block 230 may further comprise an interrupt multiplexer 388. Each of the storage controllers in the system may provide a request having a corresponding interrupt to XBAR interface block 86. These requests and interrupts may be buffered in the corresponding input logic blocks as described above. Interrupt multiplexer 388 may receive the interrupts from each of the four input logic blocks via interfaces 338, 390, 392, and 394. The selection of the proper read data element is controlled by priority/control logic block 358 via interface 402.

A reset may be provided by storage controller-0 via interface 204. The reset may be provided to request stack 350 and priority/control logic block 358. As stated above, a storage controller may reset only the input logic and the output logic within the XBAR interface block 86 which is associated with that storage controller. For example, a reset from storage controller-0 on interface 204 may only reset input logic 200 and output logic 230. This allows the XBAR logic associated with one partition to be cleared without affecting data transfers occurring in another partition. That is, the XBAR logic associated with the first partition 83 containing storage controller-0 and storage controller-1 may be cleared via the reset signals on interfaces 204 and 210 (see FIG. 5). At the same time, transfers involving units in the second partition 85 containing storage controller-2 and storage controller-3 may continue without interruption.

When a reset signal is issued to the XBAR interface block 86, not all of the logic associated with the corresponding input logic block and output logic block need be reset. The output logic that may be cleared by a corresponding reset may include the request stack 350 and the priority/control logic 358. This may include the priority logic and the state information associated with the control sequences in priority/control logic 358.

Figure 8:
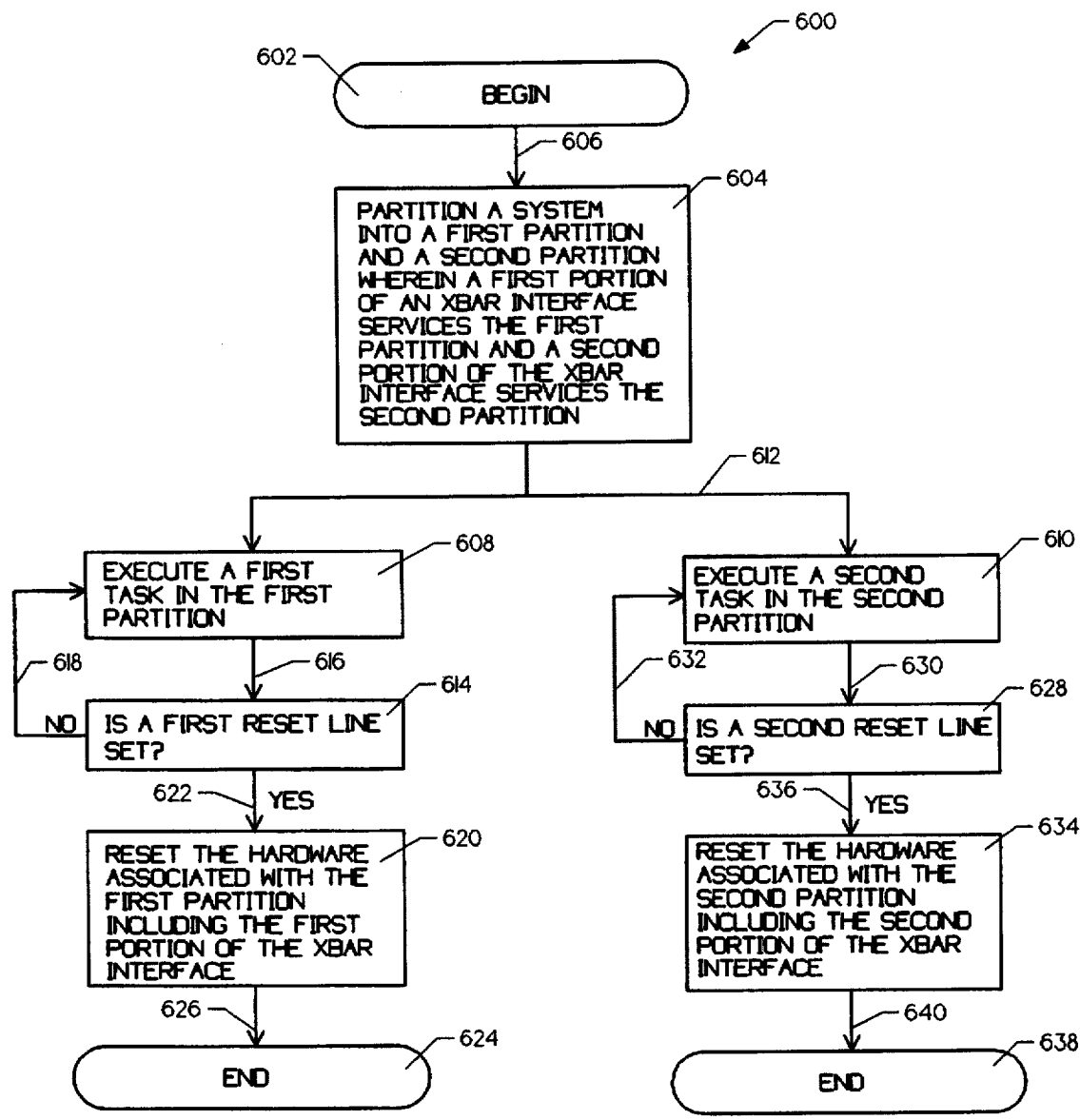
FIG. 8 is a flow diagram showing a first embodiment of the reset function of the present invention.

FIG. 8 is a flow diagram showing a first embodiment of the reset function of the present invention. The flow diagram is generally shown at 600. The algorithm is entered at 602 wherein control is passed to element 604 via interface 606. Element 604 partitions a system into a first partition and a second partition. A first portion of an XBAR interface may service the first partition and a second portion of the XBAR interface may service the second partition. Control is then passed to element 608 and 610 via interface 612.

Referring to element 608, element 608 executes a first task in the first partition. Control is then passed to element 614 via interface 616. Element 614 determines whether a first reset line is set. If the first reset line is not set, control is passed back to element 608 via interface 618. If the first reset line is set, control is passed to element 620 via interface 622. Element 620 resets a predetermined portion of the hardware associated with the first partition, including the first portion of the XBAR interface. Control is then passed to element 624 via interface 626, wherein the algorithm is exited.

Referring back to element 610, element 610 executes a second task in the second partition. Control is passed to element 628 via interface 630. Element 628 determines if a second reset line is set. If the second reset line is not set, control is passed back to element 610 via interface 632. If the second reset line is set, control is passed to element 634 via interface 636. Element 634 resets a predetermined portion of the hardware associated with the second partition, including the second portion of the XBAR interface. Control is then passed to element 638 via interface 640, wherein the algorithm is exited.

Figure 9:
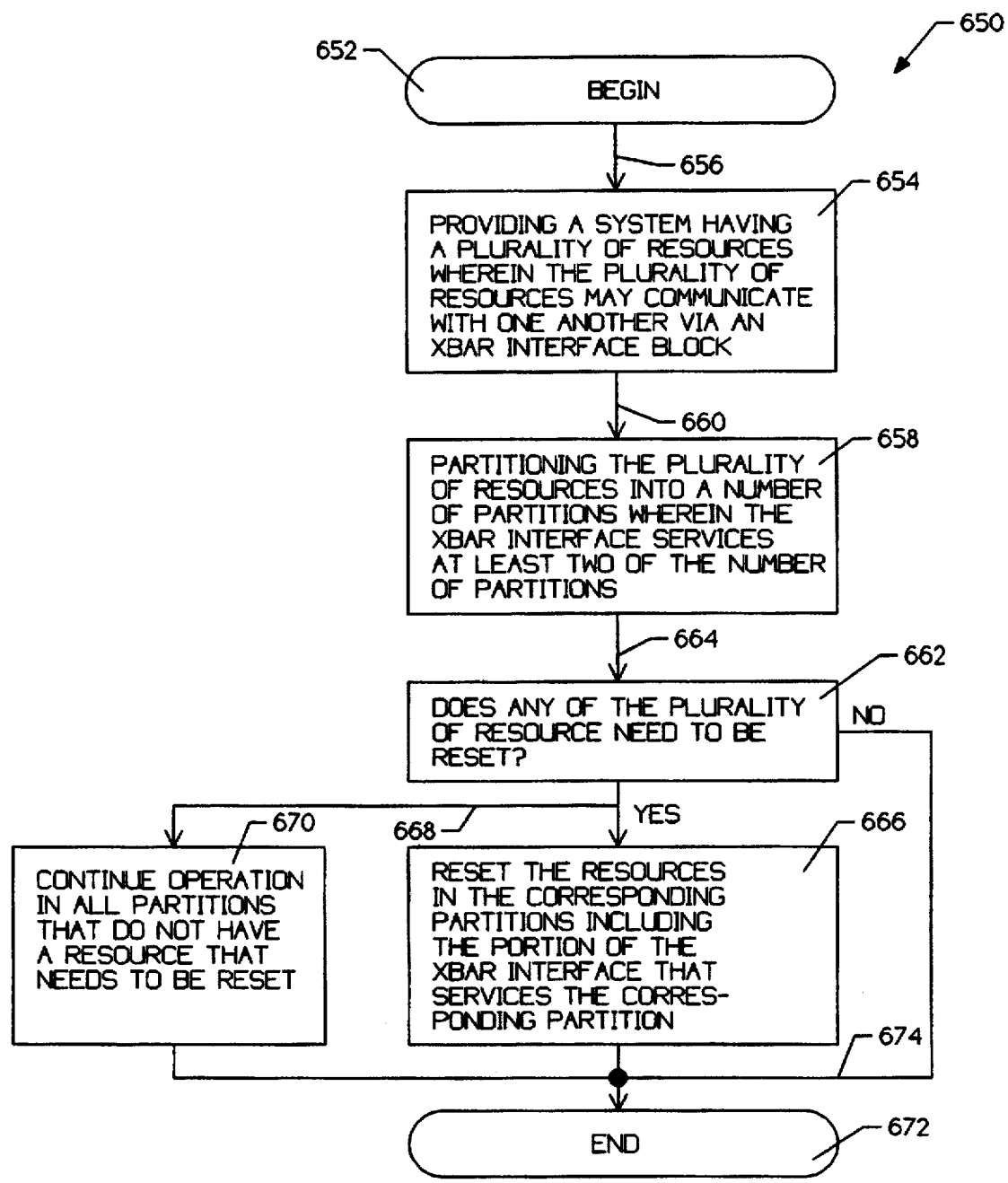
FIG. 9 is a flow diagram showing a second embodiment of the reset function of the present invention.

FIG. 9 is a flow diagram showing a second embodiment of the reset function of the present invention. The flow diagram is generally shown at 650. The algorithm is entered at element 652. Control is then passed to element 654 via interface 656. Element 654 provides a system having a plurality of resources wherein the plurality of resources may communicate with one another via an XBAR interface block. Control is then passed to element 658 via interface 660. Element 658 partitions the plurality of resources into a number of partitions wherein the XBAR interface may service at least two of the number of partitions. Control is then passed to element 662 via interface 664. Element 662 determines whether any of the plurality of resources needs to be reset.

If none of the plurality of resources need to be reset, control is passed to element 672 via interface 674. If, on the other hand, it is determined that some of the plurality of resources need to be reset, control is passed to element 670 and element 666.

Referring to element 670, element 670 continues the operation of all partitions that do not contain a resource that needs to be reset. Control is then passed to element 672 via interface 674.

Referring to element 666, element 666 resets a predetermined portion of the resources in the partitions that contain a resource that needs to be reset as determined by element 662, including the portion of the XBAR interface that services the corresponding partitions. Control is then passed to element 672 via interface 674.

Figure 10:
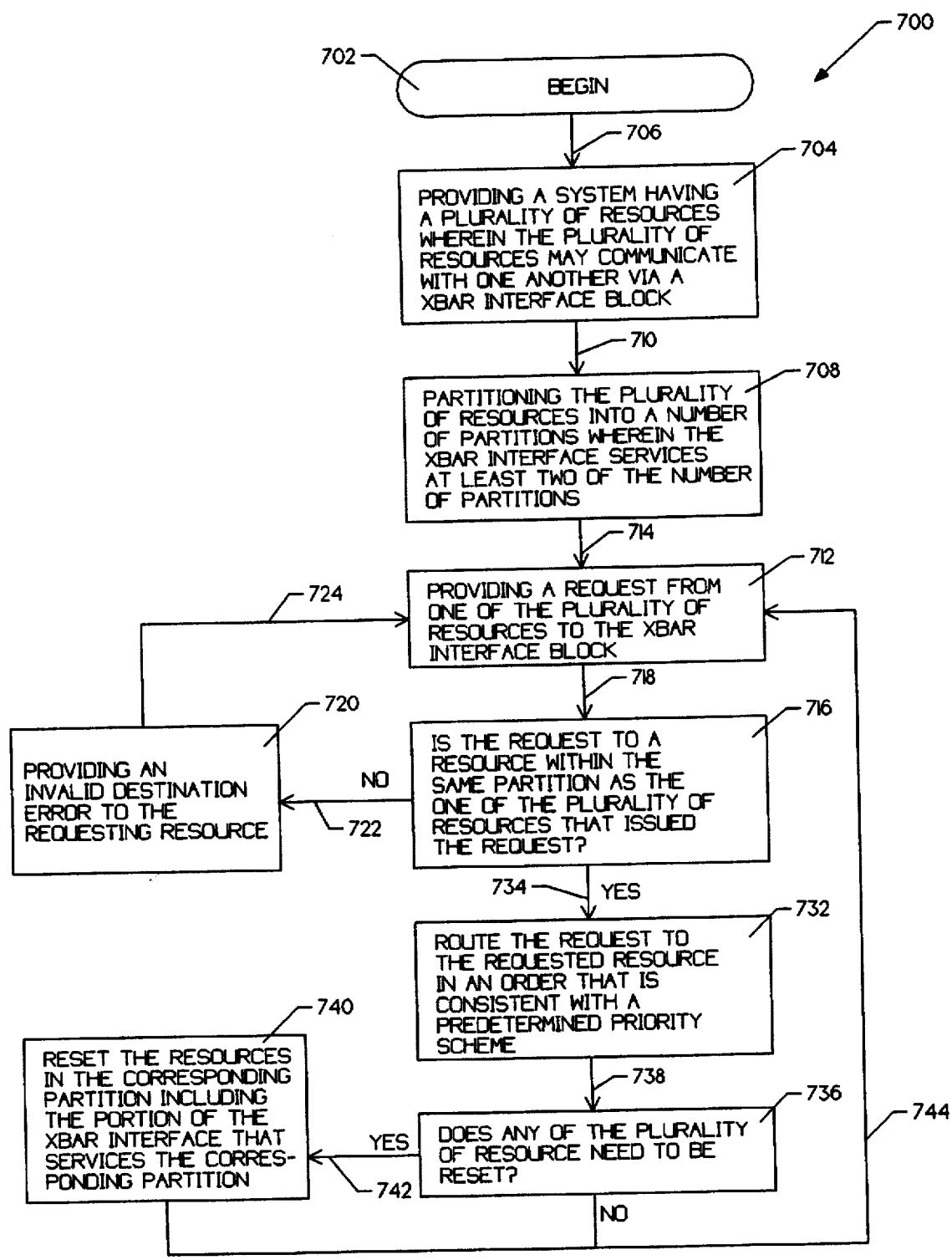
FIG. 10 is a detailed flow diagram showing the operation of a third embodiment of the present invention.

FIG. 10 is a detailed flow diagram showing the operation of a third embodiment of the present invention. The flow diagram is generally shown at 700. The algorithm is entered at element 702. Control is then passed to element 704 via interface 706. Element 704 provides a system having a plurality of resources wherein the plurality of resources may communicate with one another via a XBAR interface block. Control is then passed to element 708 via interface 710. Element 708 partitions the plurality of resources into a number of partitions wherein the XBAR interface block services at least two of the number of partitions. Control is then passed to element 712 via interface 714. Element 712 provides a request from one of the plurality of resources to the XBAR interface block. Control is then passed to element 716 via interface 718. Element 716 determines whether the request provided in element 712 is to a resource within the same partition as the one of the plurality of resources that issued the request.

If the request is to a resource that is not within the same partition as the one of the plurality of resources that issued the request, control is passed to element 720 via interface 722. Element 720 provides an invalid destination error to the requesting resource. Control is then passed to element 712 via interface 724.

Referring back to element 716, if the requested resource is available, control is passed to element 732 via interface 734. Element 732 routes the request to the requested resource in an order that is consistent with a predetermined priority scheme. Control is then passed to element 736 via interface 738.

Element 736 determines whether any of the plurality of resources needs to be reset. If any of the plurality of resources needs to be reset, control is passed to element 740 via interface 742. Element 740 resets a predetermined portion of the resources in the corresponding partitions as determined by element 736, including the portion of the XBAR interface that services the corresponding partitions. Control is then passed back to element 712 via interface 744.

Referring back to element 736, if none of the plurality of resources needs to be reset, control is passed to element 712 via interface 744.

Having thus described the preferred embodiments of the present invention, those of skill in the art will readily appreciate that the teachings found herein may be applied to yet other embodiments within the scope of the claims hereto attached.

We claim:

1. A data processing system comprising:
   a. a plurality of data processing resources wherein a first portion of said plurality of data processing resources are assigned to a first partition and a second portion of said plurality of data processing resources are assigned to at least one other partition(s);
   b. interconnect means for interconnecting said plurality of data processing resources wherein said interconnect means services said first partition and at least one of said at least one other partition(s); said interconnect means having a third portion which services said first partition and a fourth portion which services said at least one of said at least one other partition(s); and
   c. reset means for resetting predetermined one(s) of said first portion of said data processing resources in said first partition and a predetermined portion of said third portion of said interconnect means while allowing said second portion of said data processing resources in said at least one other partition(s) and said fourth portion of said interconnect means to continue to operate undisturbed.

2. A data processing system according to claim 1 wherein said interconnect means comprises an XBAR (crossbar) interface.

3. A data processing system according to claim 2 wherein said reset means further comprises at least one reset code wherein said at least one reset code is provided by predetermined one(s) of said plurality of data processing resources.

4. A data processing system according to claim 3 wherein said at least one reset code is provided to said XBAR interface to reset a first portion of said XBAR interface.

5. A data processing system according to claim 4 wherein said plurality of data processing resources comprise a plurality of storage controllers.

6. A data processing system comprising:
   a. a plurality of data processing resources wherein a first portion of said plurality of data processing resources are assigned to a first partition and a second portion of said plurality of data processing resources are assigned to at least one other partition(s);
   b. an interconnect circuit coupled to said plurality of data processing resources for interconnecting said plurality of data processing resources wherein said interconnect circuit services said first partition and at least one of said at least one other partition(s); said interconnect circuit having a third portion which services said first partition and a fourth portion which services said at least one of said at least one other partition(s); and
   c. a reset circuit for resetting predetermined one(s) of said first portion of said data processing resources in said first partition and a predetermined portion of said third portion of said interconnect circuit while allowing said second portion of said data processing resources in said at least one other partition(s) and said fourth portion of said interconnect circuit to continue to operate undisturbed.

7. A data processing system according to claim 6 wherein said interconnect circuit comprises an XBAR interface.

8. A data processing system according to claim 7 wherein said reset circuit further comprises at least one reset code wherein said at least one reset code is provided by predetermined one(s) of said plurality of data processing resources.

9. A data processing system according to claim 8 wherein said at least one reset code is provided to said XBAR interface to reset a first portion of said XBAR interface.

10. A data processing system according to claim 9 wherein said plurality of data processing resources comprise a plurality of storage controllers.

11. A data processing system according to claim 10 wherein each of said plurality of storage controllers comprises:
    a. a partition register coupled to said XBAR interface for storing a partition word, said partition word for controlling a partitioning of the data processing system;
    b. a reset register coupled to said XBAR interface for storing a reset code;
    c. a function register coupled to said XBAR interface for storing an address, a data word, a function code, and a destination address; and
    d. a controller coupled to said partition register, said reset register, and said function register for controlling the operation of said partition register, said reset register; and said function register.

12. A data processing system according to claim 11 wherein said plurality of storage controllers make a plurality of requests to said XBAR interface, each of said plurality of requests comprise the contents of said function register including said address, said data word, said function code, and said destination address.

13. A data processing system according to claim 12 wherein said XBAR interface comprises:
    a. a plurality of input logic blocks wherein each of said plurality of input logic blocks is coupled to a corresponding one of said plurality of storage controllers; and
    b. a plurality of output logic blocks wherein each of said plurality of output logic blocks is coupled to a corresponding one of said plurality of storage controllers and is further coupled to predetermined ones of said plurality of input logic blocks.

14. A data processing system according to claim 13 wherein each of said plurality of input logic blocks and each of said plurality of output logic blocks receive said reset code of a corresponding one of said storage controllers.

15. A data processing system according to claim 14 wherein each of said plurality of input logic blocks comprises:
    a. a control and destination validation logic block for determining the validity of said destination address of said request;
    b. an error logic block coupled to said control and destination validation logic block for informing a corresponding storage controller that said destination address of said request is invalid; and c. a request register coupled to said control and destination validation or logic block for buffing said request, said control and destination validation logic block enabling said request register when said destination address of said request is valid.

16. A data processing system according to claim 15 wherein each of said plurality of output logic blocks comprises:

a. a request stack for storing a plurality of requests received from said plurality of input logic blocks;

b. a priority/control logic block coupled to said request stack for prioritizing the order in which said plurality of requests stored in said request stack are serviced, said priority/control logic block selecting one of said plurality of requests in said request stack in accordance with a predetermined priority scheme; and c. a plurality of multiplexers coupled to said priority/control logic block for selecting said address, said data word, and said function code which correspond to the selected one of said plurality of requests in said request stack.

17. A method for resetting a portion of a data processing system, the data processing system having a plurality of data processing resources, comprising:

a. partitioning the plurality of data processing resources into a first partition and at least one other partition(s);

b. providing an interconnect circuit which is coupled to the plurality of data processing resources, a first portion of said interconnect circuit servicing said first partition and a second portion of said interconnect circuit servicing at least one of said at least one other partition;

c. executing a first task in said first partition;

d. executing a second task in said at least one other partition;

e. determining if a first reset code is set wherein said first reset code corresponds to said first partition;

f. resetting a predetermined portion of the data processing resources in said first partition while not disturbing the remaining data processing resources and thus said execution of said second task in said second partition if said determining step (e) determines that said first reset code is set; and g. resetting said first portion of said interconnect circuit while not disturbing said second portion of said interconnect circuit and thus said execution of said second task if said determining step (e) determines that said first reset code is set.

18. A method according to claim 17 further comprising:

h. determining if a second reset code is set wherein said second reset code corresponds to one of said at least one other partition(s);

i. reseting a predetermined portion of the data processing resources in said one of said at least one other partition (s) while not disturbing said data processing resources and thus said execution of said first task in said first partition if said determining step (h) determines that said second reset code is set; and j. reseting said second portion of said interconnect circuit while not disturbing said first portion of said interconnect circuit and thus said execution of said first task if said determining step (h) determines that said second reset code is set.

19. A method for resetting a portion of a data processing system, the data processing system having a plurality of data processing resources, comprising:

a. partitioning the plurality of data processing resources into a plurality of partitions;

b. providing an interconnect circuit having a plurality of portions, said interconnect circuit being coupled to the plurality of data processing resources, each of said plurality of portions of said interconnect circuit servicing a corresponding one of said plurality of partitions;

c. executing a plurality of corresponding tasks in said plurality of partitions;

d. determining if any of the plurality of data processing resources need to be reset and determining which partitions correspond thereto;

e. resetting a predetermined portion of the data processing resources in said corresponding partitions if said determining step (d) determines that said any of the plurality of data processing resources need to be reset; and f. resetting a corresponding portion of said interconnect circuit while not disturbing the remaining portions of said interconnect circuit if said determining step (d) determines that said any of the plurality of data processing resources need to be reset.

20. A method for resetting a portion of a data processing system, the data processing system having a plurality of data processing resources including a requesting data processing resource and a destination data processing resource, wherein said reguesting data processing resource intends to transfer signals to said destination data processing resource, comprising:

a. partitioning the plurality of data processing resources into a plurality of partitions;

b. providing an interconnect circuit having a plurality of partitions, said interconnect circuit being coupled to the plurality of data processing resources, each of said plurality of portions of said interconnect circuit servicing a corresponding one of said plurality of partitions;

c. providing a request from the requesting data processing resource to said interconnect circuit;

d. determining if said requesting data processing resource is in the same partition as the destination data processing resource;

e. providing an invalid destination error to the requesting data processing resource if said determining step (d) determines that said requesting data processing resource is not in the same partition as destination data processing resource;

f. determining if said destination data processing resource is available;

g. providing a destination unavailable error to the requesting data processing resource if said determining step (f) determines that said destination data processing resource is not available;

h. routing said request to the destination data processing resource pursuant to a predetermined priority scheme;

i. determining if any of the plurality of data processing resources need to be reset and determining which partitions correspond thereto;

j. resetting a predetermined portion of the data processing resources in said corresponding partitions if said determining step (i) determines that corresponding data processing resources need to be reset; and k. resetting a corresponding portion of said interconnect circuit while not disturbing the remaining portions of said interconnect circuit if said determining step (i) determines that corresponding data processing resources need to be reset.

* * * * *